United States Patent [19]

Waas

[11] Patent Number: 4,467,470

[45] Date of Patent: Aug. 21, 1984

[54] CIRCUIT ARRANGEMENT FOR T.D.M. TELECOMMUNICATION EXCHANGE SYSTEM, COMPRISING T.D.M. LINES WHOSE TIME CHANNELS SERVE PARTIALLY FOR MESSAGE CONNECTIONS AND PARTIALLY FOR THE TRANSMISSION OF SIGNALLING INFORMATION

[75] Inventor: Oskar G. Waas, Zurich, Switzerland

[73] Assignee: Siemens Aktiengesellschaft, Berlin & Munich, Fed. Rep. of Germany

[21] Appl. No.: 375,473

[22] Filed: May 5, 1982

[30] Foreign Application Priority Data

Jun. 4, 1981 [DE] Fed. Rep. of Germany ....... 3122300

[51] Int. Cl.³ .............................................. H04J 3/00
[52] U.S. Cl. ........................................ 370/66; 370/68
[58] Field of Search .................... 370/66, 68, 110.1, 58

[56] References Cited

U.S. PATENT DOCUMENTS

| 4,207,435 | 6/1980 | Okada et al. ........................... 370/68 |
| 4,320,501 | 3/1982 | Le Dieu et al. ........................ 370/63 |
| 4,392,224 | 7/1983 | Mori et al. ............................. 370/68 |

FOREIGN PATENT DOCUMENTS

| 66652 | 12/1982 | European Pat. Off. .............. 370/58 |
| 1263006 | 2/1972 | United Kingdom . | |

OTHER PUBLICATIONS

Asmussen et al., "EWSD Digital Switching System," Telcom Report, Siemens Aktiengesellschaft, vol. 4, (1981), Special Issue.

CCITT Sixth Plenary Assembly, Orange Book, vol. III-2, "Line Transmission," International Telecommunication Union, Geneva, 1977, pp. 425–437.

Primary Examiner—Douglas W. Olms
Assistant Examiner—Kenneth I. Rokoff

[57] ABSTRACT

Signaling information is transmitted over a signal channel per time-division multiplex and combined into super pulse frames each of which corresponds to the duration of a larger plurality of successive pulse frames, over the time-division multiplex switching matrix serving for the switching of message channels. A first information memory has a turnover cycle corresponding to a pulse frame and serves for the intermediate storage of message sub-information, whereas a second information memory has a turnover cycle corresponding to a super pulse frame and serves for the intermediate storage of signaling sub-information. A common holding memory assigned to both information memories regularly interrupts the read operation of the first information memory for the purpose of inserting a signaling sub-information read from the second information memory.

5 Claims, 1 Drawing Figure

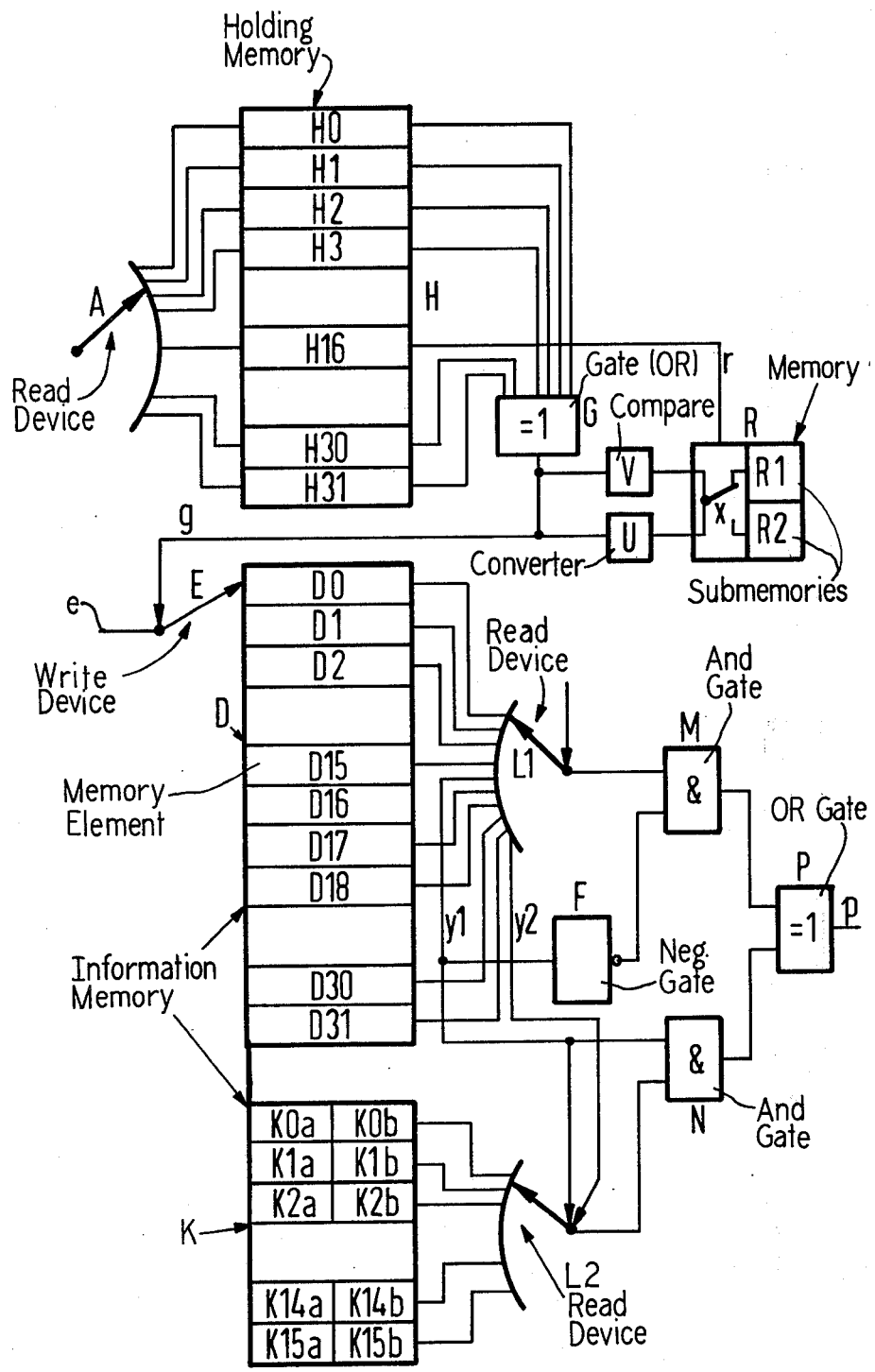

CIRCUIT ARRANGEMENT FOR T.D.M. TELECOMMUNICATION EXCHANGE SYSTEM, COMPRISING T.D.M. LINES WHOSE TIME CHANNELS SERVE PARTIALLY FOR MESSAGE CONNECTIONS AND PARTIALLY FOR THE TRANSMISSION OF SIGNALLING INFORMATION

BACKGROUND OF THE INVENTION

1. Field of the Invention

The present invention relates to a circuit arrangement for time-division multiplex telecommunication exchange systems, particularly pulse code modulation (PCM) telephone exchange systems, comprising time-division multiplex lines on which a plurality of time channels form a time-division multiplex, and on which different, successively following time slots are assigned to the time channels, and on which the time slots are arranged in pulse frames. In addition the respectively same time slot is assigned to each of the individual time channels in the various, successive pulse frames. Time-slot multiples equipped with information memories and holding memories are provided by way of which time channels on a time-division multiplex line connected at the input can be individually switched with time channels of a time-division multiplex line connected at the output. The arrangement further comprises a respective signal channel per time-division multiplex and serving as one of its time channels for the transmission of switching identifiers individually assigned to the remaining time channels, the time slots of the signal channel being combined over a plurality of pulse frames into pulse frames which, just like the pulse frames, successively follow one another. Super pulse frame time slots within a super pulse frame are assigned to the remaining time channels which serve as connection-associated message channels. Information memories are provided in wich, on the one hand, the write operation is sequenced in accordance with information memory element addresses stored in the holding memory, the holding memory being cyclically read in accordance with the successive time slots of the channels of the input time-division multiplex lines and, on the other hand, the read operation is cyclically sequenced in accordance with the successive time slots of the channels of the output time-division multiplex lines.

2. Description of the Prior Art

In time-division multiplex telephone systems as are described, for example, in the periodical "Telcom Report," Vol. 4/1981/Supplement, fully incorporated herein by this reference, a respective common signal channel is provided for a plurality of time channels, for example, for 30 time channels. The signal channel serves for the transmission of signaling informatin in individual assignment for each of the remaining (30) time channels which can be individually and selectively utilized as message channels for the completion of individual connections.

In a generally known manner, the sub-information transmitted over a time-division multiplex line and individually corresponding to the time channels are ordered in pulse frames. A pulse frame always comprises a series of sub-information of which each is respectively assigned to a time channel. One of the sub-information is assigned to the signal channel. Since the sub-information assigned to the signal channel within a single pulse frame would not suffice in order to signalize the individual switching identifiers of the message channels for the remaining time channels of the appertaining time-division multiplex line serving as information channels (cf. German Letters Pat. No. 1,910,974, corresponding to British patent specification No. 1,263,006, both of which are fully incorporated herein by this reference), the sub-information corresponding to the signal channels are combined over a plurality of pulse frames into super pulse frames within which the chronological position, i.e. the chronological relationship to the respective beginning of each super pulse frame, individually specifies the assignment of a sub-information to one of the remaining time channels employed as message channels. For this purpose, the sub-information assigned to the signal channel within a respective pulse frame can be assigned to one each of the remaining or to two or more of the remaining time channels of the appertaining time-division multiplex line employed as time channels, or, on the other hand, the sub-information within two or more successive pulse frames can be assigned to one each of the remaining time channels. Generally, the sub-information lying within a single pulse frame and assigned to a signal channel is sub-divided into two parts with the same respective plurality of bits, of which each respective part is individually assigned to one of the remaining time channels, i.e. one of the time channels serving as message channels.

In time-division telephone exchange systems (for example the periodical "Telcom Report" Supra), it is standard to accept the signaling sub-information assigned to the time channels of each of the time-division multiplex lines and serving for the signaling of switching identifiers with the assistance of the decentralized control device of a terminating group (LTG) (the same applies to analog trunk lines and to analog subscriber lines) and to forward them to a central control unit. This process is the signaling sub-information and designationally feeds them to those decentralized control devices of those terminating groups by way of which those connections were forwarded which extend over the time channels belonging to the time-division multiplex line.

In order to significantly reduce the considerable control unit load which occurs from the mere switching identifier forwarding by means of signaling sub-information which are always to be taken by the terminating groups from that time channel of each of the time-division multiplex lines serving for the signaling of switching identifiers and, subsequently, are to be resupplied to each of these time channels according to the exchange data of each individual connection of all through-connected connections, an arrangement was created according to the aforementioned German Letters Pat. No. 1,910,974 which, for the purpose of switching sub-information serving for the signaling of switching identifiers from a switching matrix for the through-connection of message connections ("connection switching matrix"), additionally provides a further switching matrix ("signal switching matrix") for the through-connection of such connections via which the sub-information corresponding to the message connections and serving for the signaling of switching identifiers can be switched. This circuit arrangement is based on the fact that each of the sub-information is provided with a respective assignment information which specifies the assignment to the respective message time channel.

SUMMARY OF THE INVENTION

In contradistinction to the arrangement known from the aforementioned German Letters Patent, the invention is based on the concept that an assignment information of the aforementioned type need not be provided and that this assignment, as already mentioned above, results from the chronological relationship to the respective beginning of each super pulse frame. This precondition which, therefore, is based on an advantageous elimination of the special assignment information, makes necessary that the switching of the sub-information serving for the signaling of switching identifiers be rendered possible in some other manner.

In a circuit arrangement of the type initially set forth above, it is therefore the object of the invention to make possible a switching of the sub-information serving for the signaling of switching identifiers and individually assigned to the message channels for that purpose under the pre-condition that no auxiliary information specifying such an assignment are attached to the sub-information. In a known manner (cf. German Letters Pat. No. 1,910,974 supra), this is to serve the purpose of relieving the simple control unit and the decentralized control devices of the task of switching identifier forwarding.

The above object is achieved, in accordance with the present invention, in that, in addition to a first information memory whose read cycle corresponds to the pulse frame duration, a second information memory is provided whose program execution in the read mode occurs by a step corresponding to a signal channel sub-information at each read cycle of the first information memory and whose turn around cycle, accordingly, corresponds to a super pulse frame duration which amounts to a multiple of the pulse frame duration. With the exception of the signal channel sub-information, the sub-information arriving over the input channels are stored in the first information memory and the signal channel sub-information arriving in the constantly recurring sequence of their time slots within each of the super pulse frames are stored at a plurality of information memory locations provided in accordance with the multiples in the second information memory, being stored according to the information memory element address stored in a holding memory. During the cyclical read operation of the first information memory, the read operation of the second information memory is regularly continued by a step corresponding to a signal channel sub-information, being regularly continued upon attainment of the signal channel time slot, i.e. of one of the pulse frame time slots, whereupon the read operation of the first information memory is again continued.

The invention creates the possibility of likewise through-connecting the signaling information belonging to each of the message channels over a time-division multiplex switching matrix, namely, likewise given the pre-condition that the signaling information exhibit no additional assignment information which would specify an assignment of the respective signaling information to one of the remaining channels employed as message channels. This is of particular significance for so-called dedicated connections; dedicated connections being those connections through-connected over channels, i.e. over time-division multiplex channels in the present case, which are maintained in the through-connected condition over a longer time and serve for the direct connection of different exchanges to one another and by way of which individual, selected connections can be successively completed and, in turn, disconnected without the control elements of the appertaining exchange in which such dedicated connections are through-connected having anything to do with the switching identifier forwarding in the manner discussed above.

BRIEF DESCRIPTION OF THE DRAWINGS

Other objects, features and advantages of the invention, its organization, construction and operation, will be best understood from the following detailed description taken in conjunction with the accompanying drawings, on which there is a single FIGURE is a schematic representation of an exemplary embodiment of the invention.

DESCRIPTION OF THE PREFERRED EMBODIMENTS

The illustrated embodiments of the invention is shown only in terms of those components which adds significantly to its understanding. The following description, which first treats the general interrelationships and functions of the exemplary embodiment of the invention and only then enters into its detailed characteristics, presumes that a multi-stage switching matrix designed for PCM connections which is partially constructed of time stages and partially of space stages is already well known to those skilled in the art; for example, such a switching matrix is illustrated and described in the allowed German application No. 21 08 745, fully incorporated herein by this reference, particularly FIG. 1 and the appertaining description.

The illustrated time-slot multiple is a component of a larger PCM time-division multiplex switching network. For the purpose of completing a connection, a free connection path which can be completed over free connection channels and time-division multiplex lines is sought and selected in a manner known per se with the assistance of a link-finding device. Holding memories are provided in conjunction therewith. The holding memory H is assigned to the illustrated time-division multiple. Holding memories are likewise assigned to further time-slot multiples and space-slot multiples which are not illustrated on the drawing.

The aforementioned holding memories serve the purpose of storing exchange data which respectively specify the assignment of outgoing time channels to incoming time channels within one of the multiples. This assignment corresponds to the through-connection data for one respective connection in a space-switching multiple of a conventional type (input coordinate line number/output coordinate line number).

As is known, exchange data for a respective connection are determined by means of information-processsng logical linkage operations with the assistance of a link-finding device on the basis of data concerning the condition (free or busy) of all determining portions of the switching matrix which are stored in an occupation memory (route-finding network in systems of an earlier type.) The exchange data unequivocally indicates the course of a connection to be through-connected and through-connected over the multi-stage switching matrix with regard to the intermediate lines and the matrix switching points or, respectively, the time-division multiplex lines, time channels, time slots, etc. which are under consideration. Such link-finding operations also occur in the present case for each connection to be through-connected. If it is thereby a matter of a multichannel connection instead of a single-channel connection, then a plurality of such link-finding operations can be individually executed for the plurality of connection completion operations which is thereby required.

Insofar as they relate to a connection leading over the appertaining time-division multiplex switching matrix network, the exchange data determined by link-finding operations are stored in holding memories of the time-slot multiples and of the space-slot multiples. In the case of the time-slot multiples, the memory locations of the respectively assigned holding memory are continuously assigned to the channel numbers of the incoming time channels. The connection-associated sub-information arriving over the incoming time channels of the PCM time-division multiplex line per pulse frame are written in the respective information memory, for example the information memory D, assigned to the appertaining time-slot multiple, being inscribed according to the exchange data which indicate the allocation of the outgoing time channels to the incoming time channels and are stored per incoming time channel at one each of the memory locations of a holding memory in the form of memory location addresses of the information memory. In contrast thereto, the read operation which serves for an individual forwarding of the sub-information over the outgoing time channels occurs cyclically. Therefore, per incoming time channel, that information memory location address under which the sub-information successively arriving via the time channel are to be inscribed, i.e. intermediately stored, is indicated in a holding memory H at a memory location permanently assigned to the incoming time channel.

As already mentioned, the memory locations of the information memory D are continuously assigned to the time channels of an outgoing time-division multiplex line. For the purpose of forwarding the intermediately-stored sub-information from the information memory, consequently, its memory locations are cyclically selected according to the time slots of the outgoing time channels. The read device L1 serves this purpose.

The cyclical reading of the sub-information from the information memory D of the time-slot multiple which are to be transmitted over a time-division multiplex line, for example the line p, departing from a PCM time-slot multiple therefore occurs with the assistance of the read device L. Therefore, for the purpose of sequencing this cyclical read-out, the read device of the time-slot multiple is continously advanced. In contrast thereto, the inscription of the sub-information arriving over the time-division multiplex line incoming to the PCM time-slot multiple occurs with the assistance of the holding memory H.

The description now having treated the inter-relationships and functions of the exemplary embodiment of the invention in a more general manner now turns to a discussion of the specific features of the invention.

A PCM time-division multiplex system in which 32 channels are formed on a time-division multiplex line by means of time-slot multiple division is described in the Orange Book, Vol. III-2, Recommendation Rec. G. 732 (Line Transmission/4. Signaling, pp. 429ff) of the Sixth Plenary Assembly (September 27-October 8, 1976) of the International Telegraph and Telephone Consultative Committee (CCITTT) and is fully incorporated herein by this reference. One channel (channel 0) serves, among other things, for the transmission of a frame identifier character, whereby the time slot of the pulse frame boundaries is indicated. A further channel (channel 16, a signaling channel) serves for the transmission of signaling information for all remaining 30 channels which can be employed as message channels and, to this end, can be individually and randomly occupied in a manner known per se in the completion of individual connections. In a manner known per se, signaling information serve for the identification of the beginning of switching identifiers and of the end of switching identifiers, for example, end of dial identifier, start character, end character, fee pulses and the like, which are to be transmitted in conjunction with a respectively completed connection in addition to the actual message information.

The sub-information which can be transmitted per channel and per pulse frame are also referred to as "words". One word always encompasses a sequence of 8 bits per channel and per pulse frame.

Since, however, 8 bits would not suffice for signaling switching identifiers for the 30 channels which are employed as message channels, the words of the 16$^{th}$ respective time slot of a total of 16 successive pulse frames are combined into a super pulse frame. One of these words serves, among other things, for the identification of the time slot of the super pulse frame boundaries. Of the remaining 15 words of the signaling channel, one each serves for signaling for two message channels. Each of these words comprises 8 bits. The first four bits of a word, also referred to as "half word", are always continuously assigned to one message channel and the other four bits, likewise referred to as to "half word", are continuously assigned to a further message channel. Consequently, the assignment of each half word to a message channel derives, on the one hand, from the time slot of the appertaining word in the signaling channel in relation to its super pulse frame boundaries and, on the other hand, therefrom whether the appertaining half word resides at the first or the second location within the total word. This assignment is generally fixed and requires no assignment information, as is described in the aforementioned German Letters Pat. No. 1,910,974.

A time-slot multiple is excerpted on the drawing. It is a component of a multi-stage switching matrix of a PCM telephone exchange system. The time-division multiplex line e is connected to the time-slot multiple at its input side. The time-division multiplex line p is connected to the time-slot multiple at its output side. The 32 mentioned time channels are conducted over these timedivision multiplex lines. In a manner known per se, they form a respective time-division multiplex on each of the two time-division multiplex lines. Different, successively following time slots are permanently assigned to the time channels. These time slots are arranged in pulse frames in a known manner. The same respective time slot is assigned to each of the individual time channels in the various, successive pulse frames.

The time slot multipe is equipped with two information memoreis D and K and with a holding memory H. The time channels on the input side time-division multiplex line e can be individually switched to the time channels on the output time-division multiplex line p over the timeslot multiple illustrated on the drawing.

One of the time channels serve for the transmission of switching indentifiers individually assigned to the remaining time channels. This channel is referred to as a "signal channel" or also (previously) as a "signaling channel". It has already been mentioned that its time slots are combined over a plurality of pulse frames into super pulse frames which, just like the pulse frames, follow one another in succession; as likewise already described, the time slots within the super pulse frames are permanently assigned to the remaining time channels which serve, connection-associated, as message channels. The chronological relationship of the half words serving as signaling information lying in this fixed assignment determines to which of the time-division multiplex channels serving as message channels a respective half word is assigned for the purpose of switching identifier signaling.

In the case of the information memory D, which may also be referred to as a "full memory", the write operation is sequenced in accordance with information memory element addresses stored in the holding memory H. A write device E serves this purpose. In contrast thereto, the read operation is cyclically sequenced in accordance with the successive time slots of the channels conducted over the time-division multiplex line p connected to the output. The holding memory H is cyclically read in accordance with the successive time slots of the channels conducted over the time-division multiplex line e connected to the input.

As can be derived from the drawing, the information memory D exhibits information memory elements D0–D15 and D17–D31. As is known, the first respective signal channel serves, among other things, for the transmission of the pulse frame identifier word. This serves the purpose of synchronization in a known manner. The information memory elements D1–D15 and D17–D31 serve for the acceptance of the PCM words of the channels of this time-division multiplex line serving as message channels which arrive over the time-division multiplex line e. For receiving each of these PCM words, accordingly, the write means E, with the assistance of the information memory element address stored in the holding memory H, is respectively set to an information memory element thereby determined.

The information memory element D16 is located between the information memory element D15 and the information memory element D17. This will be discussed in detail hereinbelow. Moreover, a further information memory K is provided. In the following, it is always referred to as the "signaling information memory". Its memory elements K0a/ K0b–K15a/K15b serve for the acceptance of the signaling information. The first of the information memory elements K0a/K0b serves, among other things, for the acceptance of the super pulse frame identifier word. The further information memory elements K1a/K1b–K15a/K15b serve for the acceptance of the half words serving for the signaling of switching identifiers. Each of the memory elements, for example the memory element K0a/K0b is subdivided into two parts, for example the parts K0a and K0b. Such a memory element comprises a total of 8 bits; consequently, each of its two parts comprises 4 bits memory capacity. One of the remaining channels employed as message channels which proceed over the outgoing time-division multiplex line p is respectively permanently assigned to each of the two parts of the memory elements K1a/K1b–K15a/K15b. As already explained, of the PCM words transmitted over the signal channel, the first PCM word within a super pulse frame serves, among other things, for the transmission of the super pulse frame identifier word. The second of the PCM words comprises the two half words serving the signaling of switching identifiers, the half words being assigned to the two first of the remaining time channels serving as message channels (for example, channels 1 and 2). The analogous case applies to the further PCM words ("sub-information") transmitted over the signal channel.

As has been explained, the write device E of the information memory D is set according to the information memory element addreses stored in the holding memory H. This setting occurs anew and separately for each sub-information arriving over the time-division multiplex line e. With the assistance of the information memory element addresses stored in the holding memory H, the sub-information transmitted on the time-division multiplex line e in the channel serving as message channels are inscribed into the information memory elements D1–D15 and D17–D31 according to those addresses. In contrast thereto, the sub-information transmitted on the time-division multiplex line e in the channel employed as the signaling channel are stored in the signaling information memory K. This is described in greater detail below.

As mentioned, the memory elements, for example the memory element K1a/K1b, in the signaling information memory K are divided into two parts, for example the parts K1a and K1b. Each of these parts is permanently assigned to one of the remaining channels employed as message channels which proceed over the outgoing time-division multiplex line p. Consequently, one of the signaling information memory elements always serves for accepting the signaling information of two chronologically successive channels on the time-division multiplex line p. Also consequently, the signaling information arriving over the time-division multiplex line e in the signal channel having the time slot 16, the signaling information, of course, always comprising two half words per pulse frame, with each of the half words assigned to one of two chronologically successive channels on the time-division multiplex line e, is to be stored in two memory elements of the signaling information memory K, i.e. each of the two half words which is contained in an incoming signaling information in the channel 16 is to be stored independently of the respective other half word. To this end, the memory element address of the memory elements K0a/K0b–K15a/K15b of the signaling information memory K can also be taken from the holding memory H in addition to the memory element addresses of the information memory elements D0–D31. Since the assignment of each channel on the incoming time-division multiplex line to a respective channel on the outgoing time-division multiplex line means the assignment of their time slots within pulse frames, this assignment is also valid for the time slots of the half words of the sub-information within the super pulse frames serving for signaling.

In order, however, to also be able to derive the memory element addresses for the selection of the memory element of the signaling information memory K from the holding memory H, the holding memory H is equipped with a memory R and with a comparator V and a converter U. For the purpose of explaining the manner of operation of these elements, let it first be presumed that the content of the holding memory element H2 is stored in the memory R. Let, therefore, the read device A of the holding memory H, which is continuously cyclically operated and which causes the respectively-reached holding memory element, for example the element H1, to emit its memory content non-destructively towards the gate circuit G, has reached the holding memory element H1. Since the content of the holding memory element H2 is stored in the memory R and the content of the holding memory element H1 is forwarded over the gate G onto the line g, and since the contents of the various holding memory elements must all differ from one another since they represent entirely different information memory element addresses, the comparator V receives different information memory element addresses over its right and left inputs as viewed on the drawing, whereupon the comparator V does not react. Consider this to be the like case upon attaining of the previous information memory elements by the read device A.

Subsequently, i.e. after attainment of the memory element H1, the read device attains the holding memory element H2 and, in the described manner, causes the forwarding of its memory content, non-destructively, i.e. without cancellation of the memory element content at the element H2, over the gate G and the control line g to the write device E of the information memory D. This memory content, i.e. a specific information memory element address, as mentioned, also arrives at the comparator V. This now identifies coincidence with the memory content of the memory R and causes its cancellation. Further, the comparator registers this coincidence in order, after program execution of the read device A to the next holding memory element H3, to inscribe its memory content in the memory R. Subsequently, the comparator V again determines inequality at every further program execution of the read device A and, consequently, does not react and only reacts in the described manner again when it reaches the holding memory element H3 where, of course, it again identifies coincidence.

Previously, however, in particular when the read device A has reached the holding memory element H16, it emits a "fetch information" order to the memory R via the output line r, letting the fetch information be permanently stored in the holding memory element. In response thereto, the memory R emits its memory content to a converter U. For the respective sub-information arriving on the time-division multiplex line e, in a specific time slot, this memory content, of course, indicates the new time slot in which the sub-information must be retransmitted on the time-division multiplex line p. The assignment information which, as described bove, derives from the link-finding operation lies in this memory content.

In order to make the explanations provided above more accurate, a further detail explanation is provided by back-tracking to set forth that the memory R is, in fact, bipartite and comprises sub-memories R1 and R2 and that the comparator V is connected in continuous alternation to the sub-memories R1 and R2 by means of a transfer switch x which is shown as a mechanical contact only for the purpose of simpler illustration but, in fact, is electronically designed and changes its position at every program execution operation of the read device A. When the read device A has reached a holding memory element at which the compartor V identifies the coincidence between the holding memory element content and sub-memory content, then it registers this coincidence in the described manner. When, subsequently, the read device reaches the next holding memory element, whereby, therefore, the contact x changes its position, then the comparator V again determines the coincidence between the content of this holding memory element and the content of the other of the two sub-memories and also registers this coincidence. When the read device A is subsequently advanced to the next holding memory element, then, on the basis of the first-register coincidence, the comparator, in the described manner, causes the content of the sub-memory R1 to be canceled and that, to replace it, the memory content of that holding memory element is written to which the read device A is set at that time. Subsequently, when the read device A is again advanced, the content of the other sub-memroy R2 is also canceled and, to replace it, the content of that holding memory element to which the read device A is set at that time is inscribed.

In the above-described manner it is accomplished that it is always two assignment information which exists stored in the memory R, namely, respectively stored in the sub-memories R1 and R2. These two assignment information specify the time slot-wise assignments of two output channels to two chronologically successive input channels. These assignment information, however, are also determined in exchange-oriented terms for the two half words which are assigned to these two channels for the purpose of signaling switching identifiers. Since these assignment information specify the transmission time slots, i.e. the time slots of the two appertaining outgoing channels, for the two sub-information transmitted over two channels following one another in the time-division multiplex, they are also employed for exchange-oriented purposes for the half words assigned to the outgoing channels. To this end, they are stored in the memory sub-memories R1 and R2.

When the read device A reaches the holding memory element H16, then the aforementioned fetch information arrives via the output line r at the memory R. By so doing, this is caused to first emit its assignment information stored in the sub-memory R1 towards the converter U, the converter U converting the same into a memory element address for the selection of one of the memory elements K0a/K0b -K15a/K15b and into a position indication. By means of this memory element address, the write device E is now set to the appertaining signaling information memory element of the signaling information memory K. The first of the two half words arriving over the signal channel 16 is then written into the appertaining memory element of the memory K. Determinant for this is the position indication which states whether these half words are to be written into one or the other portions of the appertaining memory element, for example the portion K1a or K1b. This is based on the exchange-oriented assignment of the two corresponding channels, i.e. of the appertaining outgoing channel to the appertaining incoming channel. This assignment, in addition to being expressed in the memory element address with whose assistance of the write device E is driven, is also expressed in the position indication which can have two significances.

In the same manner, the write device E is subsequently set by the converted memory content of the sub-memory R2 to a memory element of the memory K. This still occurs within the receive time slot 16. The second of the two half words, depending upon the now-existing position indication which was obtained in the conversion of the memory content of the sub-memory R2 by the converter U, is either written into the left portion or into the right portion of the appertaining memory element, for example in the memory element portions K14a and K14b. The contact x is actuated, i.e. changes its position, between these two write operations which are sequenced within the received time slot 16 and which relate to the half words on the signaling information.

On the basis of the above-described write operations, the sub-information corresponding to the channels conducted over the outgoing time-division multiplex line p now reside in the information memory elements D1–D15 and D17–D31 in the sequence in which they are to be successively transmitted in accordance with the successive time slots of these channels. Whereas the write operation is sequenced in the described manner according to the assignment information stored in the holding memory H, the read operation occurs cyclically by the read device L in accordance with the successive time slots of the channels serving message transmission which are conducted over the time-division multiplex line p connected at the output side. In this manner, the contents of the information memory elements are brought forward for transmission over the time-division multiplex line p with the assistance of the cyclically-operating read device L. Forming an exception, thereby, is the time slot 16 which corresponds to the information memory element D16. When the read device L1 reaches the output of the memory element D16 which lies between the two outputs assigned to the information memory elements D15 and D17, it emits a command over a control line y1 to the read device L2 which is assigned to the signaling information memory K and which effects that the memory content of that memory element, for example the memory element K2a/K2b, to which the read device L2 is presently set is read out. The program execution (advancement) of the read device L2 by one step which corresponds to a memory element of the signaling information memory K and, therefore, to a signal channel sub-information always occurs with each read cycle of the first information memory, for example, always occurs after a full turnover of the read device L1. A control path y2 is provided for this purpose, a corresponding program execution instruction being forwarded to the read device L2 via the control path y2 after every full turnover of the read device L1. When the read device L1 now reaches its output corresponding to the signal channel time slot, then a corresponding read instruction is forwarded via the control path y1 to the read device L2 which now reads the signaling information comprising the two half words stored in the next signaling information element, for example the element K3a/K3b, to which the read device L2 is now set. This signaling information arrives over a gate circuit N to a gate circuit P by way of which it is transmitted to the time-division multiplex p. Due to the negating effect of the gate circuit F, the gate circuit M is blocked during this time. Upon attainment of that information memory location in the cyclical read operation of the information memory D which corresponds to the signal channel time slot, the read operation of the signaling information memory K is regularly forwarded by a step corresponding to a signal channel sub-information (two half words), whereupon the read operation of the information memory D is again continued. The interposition of the read operation at the signaling information memory K is accomplished with the assistance of a control command transmitted over the control line y1, the control command being obtained with the assistance of the read device L1. This control command can be directly transmitted from the read device L1 to the read device L2. It can also comprise an address. However, it is also possible to store an indication data in the information memory D16 and, given the cyclical selection of all information memory elements in succession, to take this indication data from the information memory element D16 when it is reached by the read device L1 and to evaluate this indication data for the formation of the control command to be transmitted over the control path y1.

With the assistance of the arrangement described on the basis of the drawing, it is possible to through-connect the signaling information which is assigned to each of the channels transmitted over the time-division multiplex line e to the time-division multiplex line p in a time-division multiplexer manner just like the words (subinformation) assigned to the channels. Thereby, the exchange-oriented assignment occurs respectively per pulse frame for the words serving the message transmission and per super pulse frame for the half words serving signaling. These two types of exchange-oriented assignments, namely, on the one hand, that the channel serving for message transmission correspond to one another and, on the other hand, that the half words within the signal channel serving for signaling correspond to one another.

As discussed above, of the PCM words transmitted over the signal channel, the first within a super pulse frame serves, among other things, for the transmission of the super pulse frame identifier word. The second of the PCM words comprises the two half words serving the purpose of signaling switching identifiers which are assigned to two first of the remaining time channels serving as message channels. As an example, it was thereby specified that the channels 1 and 2 are assigned to the two half words of that second of the PCM words transmitted over the signal channel within a super pulse frame. Deviating therefrom, however, this assignment can also be differently fixed. In conjunction with the explanations provided in the above-cited Orange Book, the channels 1 and 17, for example, can also be assigned to the two half words of the above-mentioned second PCM word, the channels 2 and 18 to the third PCM word, etc. In this case, the circuit arrangement described on the basis of the drawing operates in an analogous manner.

Although I have described my invention with respect to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a time-division multiplex pulse code modulation (PCM) telecommunication exchange system in which time-division multiplex lines have pluralities of time channels with each plurality forming a time-division multiplex in which successively-following time slots are assigned to the time channels and are arranged in pulse frames and the same respective time slot is assigned to each of the individual time channels in various, successive pulse frames; and a respective signal channel per time-division multiplex and serving as one of its time channels for the transmission of switching identifiers individually assigned to the remaining time channels of the respective time-division multiplex, a plurality of pulse frames forming a super pulse frame and a plurality of super pulse frames successively follow one another, the signal channels of the successive pulse frames of a super pulse frame being combined in the same manner; and time-division multiplex switching matrices operable to individually switch the time channels of an incoming time-division multiplex line to the time channels of an outgoing time-division multiplex line, each of said time-slot multiples comprising

- a first information memory including a plurality of first memory elements for storing respective PCM message words received in message channels over an incoming time-division multiplex line;
- a second information memory including a plurality of second memory elements for storing PCM identifier signal words received in signal channels over an incoming time-division multiplex line;
- a write device for selectivlely connecting the incoming time-division multiplex line to said first and second memory elements;
- write control means, including a holding memory comprising a plurality of third memory elements for storing memory element addresses of said first and second information memories, and a holding memory read device for cyclically reading said addresses in the sequence of the time slot of the time slot of the channels of the incoming time-division multiplex line, said write control means connected to said write device for selectively operating said first and second information memories, in accordance with the memory element addresses, to store the respective PCM words; and
- information memory read means connected to said first information memory and operable in the sequence of time slots of the time channels of an outgoing time-division multiplex line to sequentially provide thereto respective PCM message words, and connected to said second information memory to read therefrom upon attaining a signal channel time slot to provide a PCM identifier signal word to the outgoing time division multiplex line.

2. The circuit arrangement of claim 1, wherein said information memory read means comprises:
- a first read device connected to said first information memory and operated in the sequence of the time slot of the time channels of the outgoing time division multiplex line; and
- a second read device connected to said second information memory and operated in the sequence of the signal channels.

3. The circuit arrangement of claim 2, wherein:
said second read device is connected to and operated by said first read device when it is sequenced and attains the position of a signal channel time slot.

4. The circuit arrangement of claim 2, wherein:
the memory element of said first information memory corresponding to a signal channel time slot stores an address and including means for advancing said second read device in response to reading such address.

5. The circuit arrangement of claim 2, wherein:
the memory element of said first information memory corresponding to a signal channel time slot stores indication data and including means for advancing said second read device in response to reading such indication data.

* * * * *